United States Patent [19]

Mischke et al.

[11] Patent Number: 4,576,755

[45] Date of Patent: Mar. 18, 1986

[54] WATER-SOLUBLE FIBRE-REACTIVE PHTHALOCYANINE COMPOUNDS

[75] Inventors: Peter Mischke, Bad Soden am Taunus; Hermann Fuchs, Königstein, both of Fed. Rep. of Germany

[73] Assignee: Hoechst Aktiengesellschaft, Frankfurt, Fed. Rep. of Germany

[21] Appl. No.: 660,266

[22] Filed: Oct. 15, 1984

Related U.S. Application Data

[63] Continuation of Ser. No. 426,194, Sep. 28, 1982, abandoned.

[30] Foreign Application Priority Data

Sep. 30, 1981 [DE] Fed. Rep. of Germany ....... 3138864

[51] Int. Cl.[4] .................... C09B 47/04; C09B 47/28; C09B 47/30
[52] U.S. Cl. .................................. 260/245.78; 8/661; 260/242.2; 260/245.1; 260/245.73; 260/245.74; 260/245.76; 260/245.79; 260/245.8
[58] Field of Search ............ 260/242.2, 245.1, 245.73, 260/245.74, 245.76, 245.78, 245.79, 245.8

[56] References Cited

U.S. PATENT DOCUMENTS

| | | | |
|---|---|---|---|
| 3,409,633 | 11/1968 | Springer | 260/245.79 |
| 3,842,030 | 10/1974 | Maeda et al. | 260/245.79 X |
| 4,033,980 | 7/1977 | Meininger et al. | 260/245.74 |

FOREIGN PATENT DOCUMENTS

| | | |
|---|---|---|
| 1179317 | 10/1964 | Fed. Rep. of Germany . |
| 1283997 | 11/1968 | Fed. Rep. of Germany . |
| 2824211 | 12/1979 | Fed. Rep. of Germany . |
| 1118012 | 6/1968 | United Kingdom . |

OTHER PUBLICATIONS

Chemical Abstracts, vol. 88, No. 7, Apr. 3, 1978, p. 72, No. 91051y.

*Primary Examiner*—Richard L. Raymond
*Attorney, Agent, or Firm*—Curtis, Morris & Safford

[57] ABSTRACT

Water-soluble fiber-reactive phthalocyanine compounds of the general formula (1)

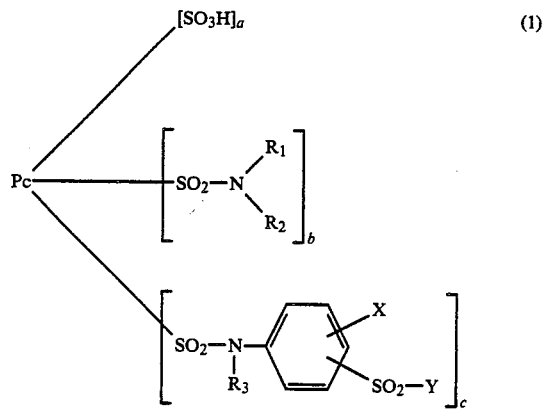

in which Pc denotes the radical of metal-free or metal-containing phthalocyanine, with the sulfonic acid or sulfonamide groups being bonded in the 3-positions of the aromatic rings of the phthalocyanine, $R_1$ and $R_2$ each denote a hydrogen atom or an alkyl group of 1–6 carbon atoms and which can be substituted by methoxy, ethoxy, propoxy, $C_2H_5-O-C_2H_4-O-$, cyano, acetylamino, carboxyl, $HO_3S-$, $H_2O_3P-$, phenyl, methylphenyl, methoxyphenyl, dimethylamino, diethylamino, $\beta$-hydroxyethylamino, $\beta$-hydroxyethoxy, N-phenylureido, N-alkyl$_{C_1-C_4}$ureido or N-cycloalkylureido groups or an allyl, 2-methallyl, crotyl or cycloalkyl group, and $R_1$ and $R_2$, together with the nitrogen atom, can represent the radical of a heterocyclic saturated or unsaturated ring, or $R_1$ and $R_2$ represent a phenyl radical which can be substituted by methyl, ethyl, methoxy, ethoxy, carboxyl or sulfonic acid groups, $R_3$ denotes a hydrogen atom or an alkyl group of 1 to 4 carbon atoms and which can be substituted by hydroxyl or carboxyl groups, X represents a hydrogen atom or an alkyl or alkoxy group of 1 to 4 carbon atoms, Y represents the vinyl group or the grouping of the formula $-CH_2-CH_2-Z$ in which Z denotes an inorganic or organic radical which can be eliminated under alkaline conditions, a represents a number between 0 and 2, b represents a number between 0 and 2 and c represents a number between 1.7 and 2.6, with the proviso that the sum of a, b and c is at most 4, a process for their preparation, and their use for dyeing wool, silk, polyamide fibers, leather or materials containing hydroxyl groups.

3 Claims, No Drawings

WATER-SOLUBLE FIBRE-REACTIVE PHTHALOCYANINE COMPOUNDS

This application is a continuation of application Ser. No. 426,194, filed Sept. 28, 1982, now abandoned.

The present invention relates to new, valuable, fiber-reactive phthalocyanine compounds of the general formula (1)

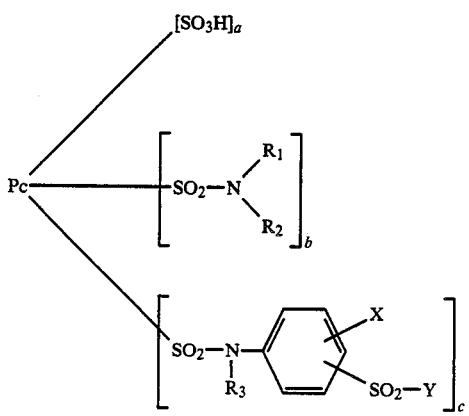

in which Pc denotes the radical of metal-free or metal-containing phthalocyanine, for example of copper, cobalt or nickel phthalocyanine, with the sulfonic acid or sulfonamide groups being bonded in the 3-positions of the aromatic rings of the phthalocyanine, in which $R_1$ and $R_2$ each denote a hydrogen atom or an alkyl group of 1–6 carbon atoms which can be substituted by methoxy, ethoxy, propoxy, $C_2H_5-O-C_2H_4-O-$, cyano, acetylamino, carboxyl, $HO_3S-$, $H_2O_3P-$, phenyl, methylphenyl, methoxyphenyl, dimethylamino, diethylamino, β-hydroxyethylamino, β-hydroxyethoxy, N-phenylureido, N-alkyl$_{C_1-C_4}$ureido or N-cycloalkylureido groups or an allyl, 2-methallyl, crotyl or cycloalkyl group, or $R_1$ and $R_2$, together with the nitrogen atom, can represent the radical of a heterocyclic saturated or unsaturated ring, for example a morpholine, pyrrolidine, piperidine or N-methylpiperazine radical, or $R_1$ and $R_2$ represent an optionally substituted aryl radical, for example a phenyl radical which can be substituted by methyl, ethyl, methoxy, ethoxy, carboxyl or sulfonic acid groups, and $R_1$ and $R_2$ can in each case be identical or different, $R_3$ denotes a hydrogen atom or an alkyl group of 1 to 4 carbon atoms which can be substituted by hydroxyl or carboxyl groups, X represents a hydrogen atom or an alkyl or alkoxy group of 1 to 4 carbon atoms, Y represents the vinyl group or the grouping of the formula $-CH_2-CH_2-Z$ in which Z denotes an inorganic or organic radical which can be eliminated under alkaline conditions, a represents a number between 0 and 2, b represents a number between 0 and 2 and c represents a number between 1.7 and 2.6, with the proviso that the sum of a, b and c is at most 4. The invention is also directed to a process for preparation of the aforementioned compounds, in which a phthalocyaninesulfochloride of the general formula (2)

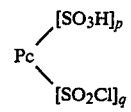

in which Pc has the abovementioned meaning, p denotes a number from 0 to 1 and q denotes a number from 2 to 4 with the proviso that the sum of p and q is at most 4, is reacted in an aqueous medium with an amine of the formula (3)

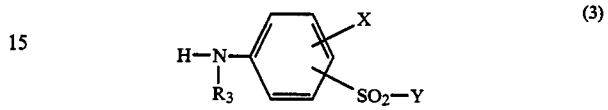

in which $R_3$, X and Y have the abovementioned meanings in the form of a concentrated aqueous solution or suspension of 1.5 to 3 moles per liter of water at a pH value of about 3 to about 8 and at a temperature of 0° to about 100° C., preferably from 0° to about 40° C., in the presence of an acid-binding agent and in the presence of a reaction accelerator, such as, for example, of pyridine, or a pyridinecarboxylic acid or of a pyridinesulfonic acid and, if appropriate, the product is reacted with a further amine of the general formula (4)

in which $R_1$ and $R_2$ have the abovementioned meanings at a pH value of about 3 to 7 and at a temperature of 0° C. to about 30° C. in the presence of an acid-binding agent, or in which the phthalocyaninesulfochloride of the formula (2) is reacted with a mixture of the amines of the formulae (3) and (4) at a pH value of about 3 to 7 and at a temperature of 0° to about 30° C. in the presence of an acid-binding agent and of a reaction accelerator (as mentioned above) and, if appropriate, if Y, in the employed amine of the formula (3), represents the β-hydroxyethyl group, the phthalocyanine compounds obtained, of the general formula (1), are converted by a treatment with a sulfating agent into the corresponding phthalocyanine compounds in which Y denotes the β-sulfatoethyl group, and to their use for dyeing or printing wool, silk, fiber materials made of linear polyamides, in particular made from hydroxyl-containing fibers, such as native or regenerated cellulose, or for dyeing leather.

German Pat. Nos. 1,179,317 and 1,283,997, German Offenlegungsschrift No. 1,795,140 and U.S. Pat. No. 3,062,830 have already disclosed dyestuffs of similar structure and having fiber-reactive β-sulfatoethylsulfonyl groups. These dyestuffs are suitable for dyeing and printing cellulose fiber materials.

Compared with this state of the art, a smaller group of reactive phthalocyanine dyestuffs has now been found (cf. the above formula (1)) which are distinguished by a surprisingly good capacity for diffusion and reaction and thereby have very valuable application properties, whereby they are significantly superior to the dyestuffs disclosed in the examples of the patent specifications referred to.

The patent specifications referred to above, and which are formulated very broadly in respect of the dyestuffs claimed, do not contain any indication that dyestuffs from the group claimed there and having a relatively large number of reactive groups, have a particularly good capacity for diffusion and are therefore distinguished by very valuable coloristic properties. It follows from the examples of the patent specifications mentioned above that the procedure used there of condensing phthalocyaninesulfochlorides with amines containing reactive groups produces dyestuffs which, on average, contain at most 1.5 reactive groups per dyestuff molecule.

By comparison the new dyestuffs of the general formula (1) mentioned at the outset contain, on average, at least 1.7 reactive groups per dyestuff molecule. However, the particular dyeing properties of dyestuffs according to the invention are not based only on the increased number of reactive groups contained in the dyestuff molecule but also on the structure of the aromatic amines of the general formula (3) mentioned above incorporated by condensation. In contrast, the reaction of phthalocyaninesulfochlorides with aliphatic or araliphatic amines containing reactive groups produces dyestuffs which, in respect of their application properties on dyeing of cellulose fiber material, have no advantage over the dyestuffs belonging to the state of the art. The coloristic properties of dyestuffs according to the invention can be additionally advantageously affected by incorporating primary or secondary amines by condensation.

Compared to the dyestuffs disclosed in the references quoted, dyestuffs according to the invention, owing to their surprisingly high capacity for diffusion and their increased reactivity, are distinguished by that they, even after a relatively short residence time in the short-time pad process, reach full tinctorial strength on the fiber material, ie. using dyestuffs according to the invention dyeing processes can be carried out in a comparatively significantly shorter time. Owing to the surprising properties mentioned, dyestuffs according to the invention load up better, not only in printing but also, in particular, in dyeing, than the dyestuffs known from the reference quoted and which are structurally most closely related, ie. to obtain the same dyeings less dyestuff must be used, whereby less dyestuff passes into the effluent (more advantageous ecological behavior).

In the grouping —$CH_2$—$CH_2$—Z for Y in the above-mentioned general formula (1), Z denotes, for example, the group —$OSO_3H$, —$SSO_3H$, —$OPO_3H_2$, —Cl or —OH.

Of the dyestuffs according to the invention, and of the general formula (1) mentioned at the outset, those are to be mentioned as particularly valuable in which $R_3$ and X are each represented by a hydrogen atom and Y is represented by the grouping —$CH_2$—$CH_2$—$OSO_3H$, —$CH_2$—$CH_2$—$SSO_3H$ or —$CH_2$—$CH_2$—Cl.

Dyestuffs of the general formula (1) are obtained in the synthesis usually in the form of mixtures of individual dyestuffs which are distinguished from one another by the degree of substitution a, b and c, which is the reason why fractional values are indicated for the indices a, b and c in specifying the formulae covering the dyestuffs according to the invention. These fractional values are average values which are found experimentally and analytically.

To prepare dyestuffs according to the invention the procedure followed is in particular to carry out the condensation reactions in relatively concentrated solutions or suspensions. The procedure involves dissolving, or incipiently dissolving, aromatic amines of the general formula (3) in an amount of 1.5 to 3 moles per liter of water and carrying out the condensation reactions with the metal-free or preferably metal-containing phthalocyaninesulfochlorides of the general formula (2) in these concentrated solutions, it being possible for the possible condensation with amines of the general formula (4) to be carried out simultaneously or subsequently to the first condensation reaction. In some cases it is advisable to dilute the reaction mixtures with half to all of the amount of water originally used, after about 2 to 4 hours' reaction time, to ensure good stirrability of the dyestuff solutions.

The aromatic amines of the general formula (3) mentioned, relative to the phthalocyaninesulfochloride of the general formula (2) mentioned, are employed in a molar excess of 20–70% over the molar amount given by the particular numerical value of the index c (cf. formula 1).

The dyestuffs thus prepared are surprisingly distinguished by excellent application properties, which make them significantly superior to the known dyestuffs, which are prepared in less concentrated solutions (about 0.2 mole to 1 mole of aromatic amine per liter of water).

Starting compounds of the formula (2) are, for example, sulfonyl chlorides or sulfo-containing sulfonyl chlorides of metal-free phthalocyanine, but preferably those of metal-containing phthalocyanines, such as, for example, copper phthalocyanine-3-disulfochloride, copper phthalocyanine-3-trisulfochloride, copper or nickel phthalocyanine-3-tetrasulfochloride, cobalt phthalocyanine-3-trisulfochloride or copper phthalocyanine-3-trisulfochloridemonosulfonic acid.

The sulfonyl chlorides of the formula (2) are prepared by known methods (German Pat. No. 891,121).

Examples of aromatic amines of the general formula (3) are 3-$\beta$-sulfatoethylsulfonylaniline, 3-$\beta$-thiosulfatoethylsulfonylaniline, 3-$\beta$-phosphatoethylsulfonylaniline, 2-methoxy-5-$\beta$-sulfatoethylsulfonylaniline, 4-$\beta$-sulfatoethylsulfonylaniline, 4-$\beta$-chloroethylsulfonylaniline, 4-$\beta$-phosphatoethylsulfonylaniline, 4-$\beta$-thiosulfatoethylsulfonylaniline, 4-methoxy-5-$\beta$-sulfatoethylsulfonylaniline, 2-methoxy-4-$\beta$-sulfatoethylsulfonylaniline or $\beta$-hydroxyethylsulfonyl derivatives thereof.

Examples of amines of the formula (4) are ammonia, methylamine, ethylamine, n- and i-propylamine, n-, iso-, sec.- and tert.-butylamine, ethanolamine, aminopropanol, N-methylethanolamine, dimethylamine, diethylamine, di-isopropylamine, diethanolamine, methoxyethylamine, hydroxyethoxyethylamine, 3-methoxypropylamine, 3-ethoxypropylamine, 3-isopropoxypropylamine, 3-cyanopropylamine, 3-acetaminopropylamine, allylamine, 1- and 2-methallylamine, crotylamine, n- and isoamylamine, aminopropionic acid, aminocaproic acid, taurine, 2-aminoethanephosphonic acid, cyclohexylamine, benzylamine, phenylethylamine, aniline, methylanilines, methoxyanilines, N,N-dimethylpropylene-1,3-diamine, N,N-diethylpropylene-1,3-diamine, N-hydroxyethylethylenediamine, di-n- and diisobutylamine, morpholine, pyrrolidine, piperidine, N-methylpiperazine, N-methylcyclohexylamine, N-ethylcyclohexylamine, N-methylaniline, N-ethylaniline, N-$\beta$-hydroxyethylaniline, 4-aminobenzenecarboxylic acid, 3-aminobenzenesulfonic acid, 3-(N'-phenylureido)-propylamine and 2-(N'-isopropylureido)ethylamine.

Examples of acid-binding agents which are used in the process according to the invention are hydroxides, carbonates, hydrogencarbonates, secondary and tertiary phosphates, borates or acetates of the metals of the first to third group of the periodic system of the elements, preferably the sodium and potassium compounds as well as the calcium compounds.

The pyridinesulfonic acids or pyridinecarboxylic acids used as reaction acceleration are, in particular, pyridinemonosulfonic, pyridinedisulfonic and pyridinetrisulfonic acids, pyridinemonocarboxylic, pyridinedicarboxylic and pyridinetricarboxylic acids, and also their derivatives substituted in the heterocycle by non-ionic substituents, such as, for example, methyl- and ethyl-substituted pyridinesulfonic or pyridinecarboxylic acids. Examples of such pyridine compounds are pyridine-2-sulfonic acid, pyridine-3-sulfonic acid, pyridine-4-sulfonic acid, pyridine-2-carboxylic acid, pyridine-3-carboxylic acid, pyridine-4-carboxylic acid, pyridine-2,3-dicarboxylic acid, pyridine-2,4-dicarboxylic acid, pyridine-2,5-dicarboxylic acid, pyridine-2,6-dicarboxylic acid, pyridine-3,4-dicarboxylic acid, pyridine-3,5-dicarboxylic acid, pyridine-2,3,4-tricarboxylic acid, pyridine-2,4,5-tricarboxylic acid, 2-methylpyridine-3-sulfonic acid, 4-methylpyridine-3-carboxylic acid, 4-ethylpyridine-3-carboxylic acid, 6-methylpyridine-3-carboxylic acid, 4,6-dimethylpyridine-2-carboxylic acid, 2,6-dimethylpyridine-3-carboxylic acid and 2-methylpyridine-3,4-dicarboxylic acid. The use of pyridine-3-carboxylic acid (nicotinic acid), which is virtually non-toxic and odor-free (German Pat. No. 2,824,211 and German Offenlegungsschrift No. 2,906,442), is particularly preferable and advantageous.

Phthalocyanine dyestuffs obtained by the processes described above are isolated in a customary manner by salting out, for example by means of sodium chloride or potassium chloride, and/or by acidifying with a mineral acid or by evaporating the neutral or weakly acidic aqueous dyestuff solution, preferably at a moderately elevated temperature and under reduced pressure.

Compounds of the formula (1) are as a rule obtained in the form of their salts, preferably in the form of the alkali metal salts, such as the sodium and potassium salts, and are used in this form for dyeing and printing fiber materials made of wool, silk, linear polyamides, but in particular made of materials containing hydroxyl groups, such as cellulose, for example linen, regenerated cellulose and, in particular, cotton and also for dyeing leather.

Dyeings with dyestuffs according to the invention are prepared in a customary manner, for example by impregnating the fiber material with an aqueous solution of the dyestuff, which, if appropriate, contains agents having an alkaline action and neutral inorganic salts, cold or at a moderately elevated temperature, squeezing off, and fixing the dyestuffs thus applied, if appropriate after an intermediate drying stage. If the padding liquor used contains an agent having an alkaline action, the subsequent fixing is effected, for example, by leaving the impregnated goods to stand for a short time. In this known short-time pad method widely used in commercial dyeing, the dyestuffs prepared according to the process according to the invention are distinguished, owing to their surprisingly high capacity for diffusion and their increased reactivity, by the fact that they achieve full tinctorial strength after only 4 hours' residence time, while in the case of the structurally most comparable dyestuffs of the abovementioned reference full tinctorial strength is obtained only after about 12 to 24 hours. Accordingly, using dyestuffs according to the invention the dyeing processes can be advantageously carried out in significantly shorter time, which fact has the great advantage that the dyeing machines can be better utilized and a higher throughput of material to be dyed becomes possible.

When dyestuffs according to the invention are used in the exhaust method they build up in a tinctorial strength which is higher by 20 to 30% than the most comparable dyestuffs of the references mentioned, ie. to obtain equally deep dyeings less dyestuff must be used, whereby less dyestuff passes into the dyeing works effluent. Dyestuffs according to the invention are thus more advantageous from an ecological point of view.

Even in textile printing the use of dyestuffs according to the invention produces a somewhat more favorable color build-up. In addition, the new dyestuffs dye, for example, non-causticized regenerated cellulose better than the known dyestuffs do.

The new dyestuffs also build up on wool to give a significantly higher tinctorial strength.

On the abovementioned fiber materials very valuable deep dyeings and prints, which are distinguished by very high light fastness values, by good to very good wet fastness values and by good to very good rubbing fastness values, are obtained by means of the dyestuffs according to the invention.

The new dyestuffs are readily soluble in water and very readily soluble in alkaline, electrolyte-containing dyeing and padding liquors.

The examples which follow serve to illustrate the invention. The parts are parts by weight, and the percentages are percentages by weight, unless otherwise indicated. Parts by weight relate to parts by volume as the kilogram relates to the liter.

EXAMPLE 1

84.3 parts of 3-$\beta$-sulfatoethylsulfonylaniline were suspended in 160 parts of water ( 1.875 mole/liter) and dissolved at pH 6 by sprinkling in sodium bicarbonate. 87.2 parts of copper phthalocyaninetrisulfochloride in dry form or in the form of a slightly moist press cake were added to this solution, 5 parts of pyridine were added, and the condensation was carried out at 10° to 13° C., during which reaction a pH range of 5.5 to 6 was maintained by adding sodium bicarbonate. Should the condensation mixture assume a pasty consistency in the course of the reaction, a small amount of water can be added little by little after about 3 to 4 hours to dilute the batch and to ensure good stirrability of the latter. The mixture was stirred until the pH value remained constant, which was the case after about 6 hours. The batch was then diluted with about 100 parts of water and stirred for a further 2 hours at about 40° C. A small, exactly measured portion of the dyestuff solution was then removed, and the diazotization value, wherefrom the degree of condensation c (cf. the general formula (1)) was calculated, was determined thereof.

The dyestuff was then precipitated by adding sodium chloride (in an amount of 15%, relative to the volume of the solution), filtered off with suction, and dried under reduced pressure at 60° C.

A salt-containing, turquoise-blue dyestuff was obtained, the structure of which, according to the determination above and according to analysis, written in the form of the free acid, was approximately of the formula

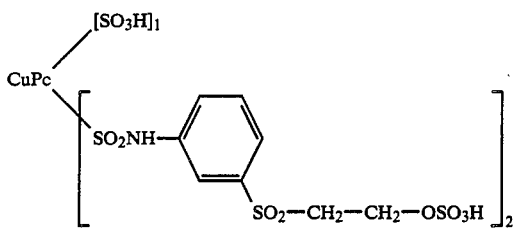

The dyestuff produced by the application and fixing methods customary and known for fiber-reactive dyestuffs had clear, turquoise-blue dyeings of high tinctorial strength on cotton.

Compared to the dyestuffs described in German Pat. No. 1,179,317, Example 1, and in German Pat. No. 2,824,211, Example 1, the dyestuff according to the invention was distinguished by the fact that full color build-up was obtained with the dyestuff in the short-time pad method after only 4 hours, while in the case of the known dyestuffs between 12 and 24 hours were necessary for this. When dyeing using the exhaust method, a color build-up which was about 20 to 30% higher than for the already known dyestuffs was obtained by means of dyestuff according to the invention.

When the instructions given in German Pat. No. 1,179,317, Example 1, were followed and the condensation reaction was carried out in the strong dilution described there (0.2 mole of 3-β-sulfatoethylsulfonylaniline per liter of water as reaction medium), a dyestuff of the formula

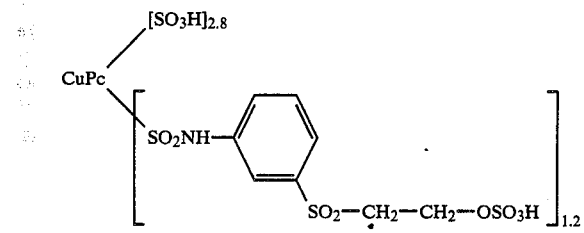

was obtained which, compared with the dyestuff according to the invention, had the abovementioned application deficiencies.

EXAMPLE 2

73.1 parts of 3-β-sulfatoethylsulfonylaniline were dissolved in 130 parts of water at pH 6 by adding about 20 parts of sodium bicarbonate. 97 parts of copper phthalocyanine-3-tetrasulfochloride were added with stirring in dry form or in the form of a moist press cake to the solution, 5 parts of pyridine were added, and the condensation was carried out at 10° to 13° C., during which reaction a pH range of 5.5 to 6 was maintained by sprinkling in sodium bicarbonate. After about 4 to 5 hours (when a spot sample of the condensation mixture spread almost uniformly on filter paper) 9 parts of N-methylaminoethanol (in the form of the hydrochloride in aqueous solution) were added, and the condensation was completed at pH 6 by stirring overnight at room temperature. The batch was diluted with about 100 to 200 parts of water, an exactly measured portion of the dyestuff solution was removed, and the diazotization value was determined on this sample. This yielded the fraction of 3-β-sulfatoethylsulfonylaniline not incorporated by condensation and, by subtraction from the total amount of 3-β-sulfatoethylsulfonylaniline used, the degree of condensation c. The dyestuff was isolated by stirring with sodium chloride (in an amount of 20%, relative to the volume of the solution), filtered off with suction, and dried under reduced pressure at 50° C.

A salt-containing, turquoise-blue dyestuff was obtained, the structure of which, according to the determination above and according to analysis, is approximately of the formula (written as the free acid)

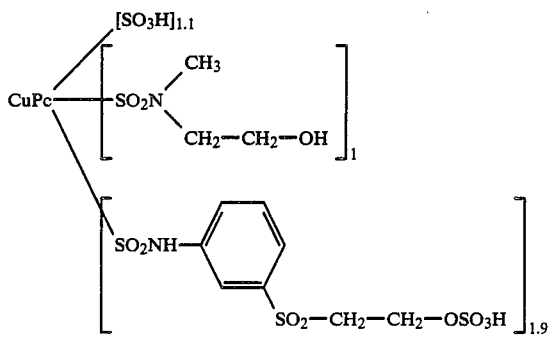

This dyestuff produced on cotton and wool, by the application and fixing methods customary and known for fiber-reactive dyestuffs, clear, turquoise-blue dyeings and prints of high tinctorial strength. Compared to the structurally most comparable dyestuffs described in German Pat. No. 1,179,317, Example 2, German Pat. No. 1,283,997, Example 2, and in German Pat. No. 2,824,211, Example 2 and Example 3a, the dyestuff according to the invention developed its full tinctorial strength on cotton in a short-time pad method after only 4 hours' residence time, while the known dyestuffs required 24 hours for this, and a slightly lower color yield was obtained.

In the exhaust method the dyestuff according to the invention produced on cotton a color build-up which was higher by about 20%. Similarly, deeper dyeings were obtained by means of this dyestuff on wool when dyeing from a dyebath rendered weakly acidic by means of acetic acid. (In all comparative dyeings, dyestuff amounts are used in each case which have the same content of pure dyestuff).

The turquoise-blue dyeings and prints obtained by means of the dyestuff claimed were distinguished by very good light fastness values and by very good stability to washing treatments and by good to very good fastness to rubbing.

When repeating the structurally most comparable dyestuff mentioned in German Pat. No. 1,283,997, Example 2, a product of the formula

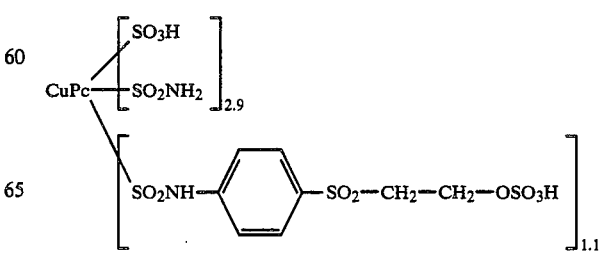

was obtained and had the abovementioned coloristic disadvantages compared with the dyestuff according to the invention.

EXAMPLE 2a

When the procedure described in Example 2 was followed, but the N-methylaminoethanol used there was replaced by an equivalent amount of one of the amines mentioned below, dyestuffs having comparably very good coloristic properties in which these dyestuffs according to the invention were markedly superior to structurally most comparable, known dyestuffs, were likewise obtained according to the invention: aminoethanol, diethanolamine, morpholine, methoxyethylamine, 2-methoxypropylamine, 3-i-propoxypropylamine, 3-aminopropanol, hydroxyethoxyethylamine, 3-acetaminopropylamine, ammonia, methylamine, ethylamine, n- and isopropylamine, n-, iso-, sec.- and tert.-butylamine, aminopropionic acid, ε-aminocaproic acid, cyclohexylamine, phenylethylamine, N-β-hydroxyethylethylenediamine, piperidine, aniline or 4-aminobenzoic acid.

EXAMPLE 3

A mixture of 56.2 parts of 4-β-sulfatoethylsulfonylaniline and 39.3 parts of 3-β-sulfatoethylsulfonylaniline was suspended in 185 parts of water ( 1.84 mole/liter). The suspension was adjusted to pH 6 to 6.5 by adding sodium bicarbonate and turned into a solution. 97 parts of copper phthalocyanine-3-tetrasulfochloride in dry form or in the form of a slightly moist press cake were added with thorough stirring to this solution, 5 parts of pyridine were added, and the condensation was performed within a temperature range of 10° to 15° C., the pH value of the reaction mixture being maintained, for example, between 5.5 and 6 by adding sodium bicarbonate. After about 5 to 6 hours the batch was diluted with about 200 parts of water, 11.3 parts of N-methylaminoethanol (in the form of the hydrochloride in aqueous solution) were added, and the condensation was completed by stirring overnight at room temperature, a pH value of 6 being maintained with the aid of a phosphate buffer. After determination of the degree of condensation c using the method described in Example 1 or 2 the dyestuff was isolated by salting out at 35° to 40° C. with potassium chloride (in an amount of 15%, relative to the volume of the solution), filtered off with suction, and dried under reduced pressure at 50° to 60° C.

A turquoise-blue, salt-containing dyestuff was obtained, the structure of which, according to the above determination of the degree of condensation, was a mixture of isomers with the approximate formula (written in the form of the free acid)

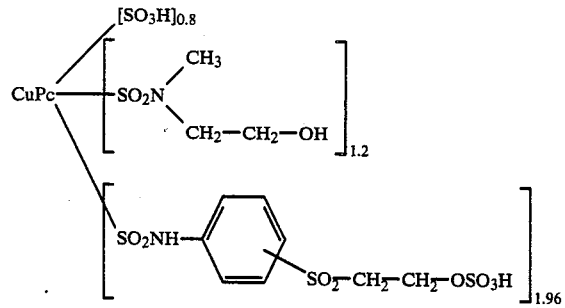

This dyestuff produced on cotton and wool by the application and fixing methods customary for fiber-reactive dyestuffs clear, turquoise-blue dyeings and prints having very good fastness properties. The fast color build-up on application by the pad dyeing processes and a good depth of dyeing obtained by the exhaust dyeing method is likewise, again, to be emphasized.

EXAMPLE 4

The procedure described in Example 2 for condensing 73.1 parts of 3-β-sulfatoethylsulfonylaniline with 97 parts of copper phthalocyanine-3-tetrasulfochloride was followed, but the 9 parts of N-methylaminoethanol used there were replaced by 12 parts of an amine mixture composed of approximately equal parts of N-methylaminoethanol, ethanolamine, diethanolamine, morpholine and methoxypropylamine.

After clarification with charcoal/kieselguhr and subsequent spray-drying the resulting dyestuff mixture was obtained as a salt-containing, blueish grey powder. The degreee of condensation c was determined in accordance with the instructions of Example 2 as 1.92.

The dyestuff mixture obtained produced on cotton and wool by the application and fixing methods customary for fiber-reactive dyestuffs clear, turquoise-blue dyeings. The mixture was distinguished by a high rate of fixing on application by pad dyeing processes and by a very good color build-up in the exhaust method. The fastness properties of the dyeings and prints were very good.

EXAMPLE 5

The condensation of 78.7 parts of 3-β-sulfatoethylsulfonylaniline with 92 parts of copper phthalocyanine-3-sulfochloride which, on average, contained 3.6 sulfochloride groups was carried out in accordance with the instructions of Example 2, but 17 parts of diglycolamine were used instead of the N-methylaminoethanol used there. After determination of the number of reactive groups in accordance with the instructions of Example 2, the dyestuff was isolated with potassium chloride (in an amount of 12.5%, relative to the volume of solution), filtered off with suction, and dried under reduced pressure at 50° C.

A salt-containing, turquoise-blue dyestuff to which the following formula

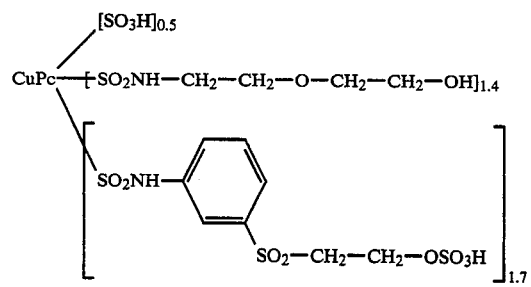

must be accorded, was obtained. This dyestuff produced on cellulose fibers by the fixing methods customary for fiber-reactive dyestuffs clear, turquoise-blue dyeings. Its advantages over structurally similar dyestuffs of the state of the art were again its high rate of fixing and its good color build-up to greater tinctorial strength.

EXAMPLE 5a

Dyestuffs having comparably good application properties were obtained when diglycolamine used in Example 5 was replaced by an equivalent amount of one of the amines mentioned below: ethanolamine, diethanolamine, morpholine, 3-i-propoxypropylamine, 3-(N'-phenylureido)propylamine and N-hydroxyethylethylenediamine.

EXAMPLE 6

60.3 parts of 4-β-hydroxyethylsulfonylaniline were stirred into 180 parts of water. 92 parts of copper phthalocyanine-3-sulfochloride which, on average, contained 3.6 sulfochloride groups were then added with thorough stirring. The mixture, after the addition of 12.5 parts of nicotinic acid, was heated to 35° C., and a pH value of about 6.5 was maintained during the condensation by sprinkling in sodium bicarbonate. After about 2 hours' reaction time the batch was diluted with about 100 parts of water and the condensation was continued at 35° C. After a further 2-3 hours the batch was cooled down with a small amount of ice to room temperature, 17.5 parts of 3-isopropoxypropylamine (dissolved as the hydrochloride in water) were added, and the condensation was completed by stirring overnight at a pH value of about 6, maintained by a phosphate buffer.

The dyestuff was isolated either by spray-drying or by acidifying with sulfuric acid and dried at 60° C. under reduced pressure.

For conversion into the sulfuric acid ester 100 parts of the β-hydroxyethylsulfonyl dyestuff thus prepared were added at room temperature with thorough stirring and external cooling to 750 parts by volume of sulfuric acid monohydrate. The mixture was stirred for several hours at room temperature, and the solution containing sulfuric acid was then poured carefully onto ice. The dyestuff which precipitated in this step was filtered off with suction, dissolved by means of sodium bicarbonate in water under neutral conditions and salted out with 7.5% of potassium chloride, relative to the volume of solution, filtered off with suction, and dried under reduced pressure at 50° C.

A salt-containing, turquoise-blue dyestuff was obtained which, written in the form of the free acid, was of the formula

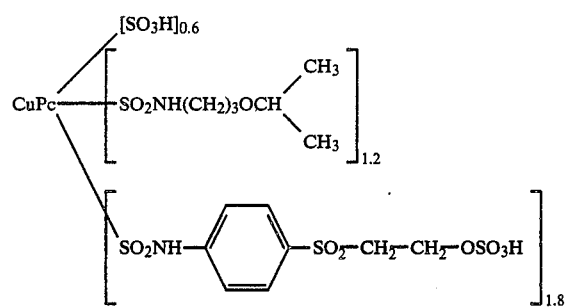

The dyestuff, similar to the dyestuffs described above, was distinguished by its rapid fixing behavior and by its good color build-up on dyeing cellulose fibers. The clear turquoise-blue dyeings and prints had good fastness properties.

EXAMPLE 7

73.1 parts of 3-β-sulfatoethylsulfonylaniline were dissolved under neutral conditions in 150 parts of water with the aid of sodium bicarbonate. 9.2 parts of aminoethanol in the form of the hydrochloride and 5 parts of pyridine were then added, the mixture was cooled down to 10° to 12° C., and 96.5 parts of nickel phthalocyanine-3-tetrasulfochloride were addeed with thorough stirring. The pH value was maintained at 5.5 to 6 by the addition, in portions, of sodium bicarbonate and the condensation was thus completed overnight by further stirring. The dyestuff was salted out with potassium chloride and isolated in a customary manner.

The dyestuff thus obtained was of the formula

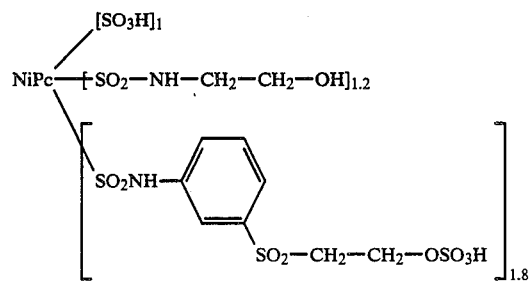

It produced, used as a reactive dyestuff, on cellulose fiber materials with rapid fixing behavior and a good color yield a clear, blueish green dyeing having good fastness properties.

We claim:

1. A water-soluble fiber-reactive phthalocyanine compound of the formula (1)

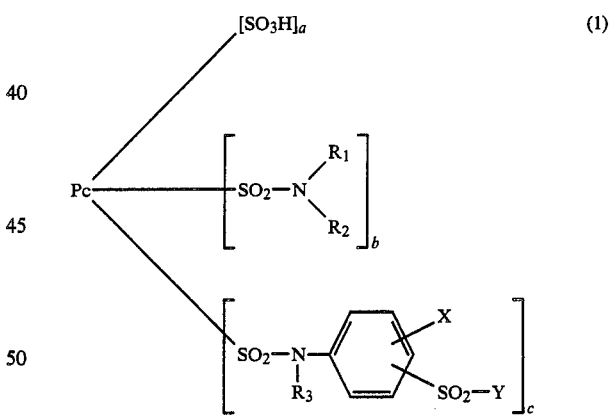

in which Pc is a radical of metal-free or metal-containing phthalocyanine, with the sulfonic acid or sulfonamide groups being bonded in the 3-positions of the aromatic rings of the phthalocyanine, in which $R_1$ and $R_2$ each is hydrogen or alkyl of from 1-6 carbon atoms or said alkyl substituted by methoxy, ethoxy, propoxy, $C_2H_5$—O—$C_2H_4$—O—, cyano, acetylamino, carboxyl, $HO_3S$—, $H_2O_3P$—, phenyl, methylphenyl, methoxyphenyl, dimethylamino, diethylamino, β-hydroxyethylamino, β-hydroxyethoxy, N-phenylureido, N-alkylureido in which the alkyl is from 1-4 carbon atoms or N-cycloalkylureido, or allyl, 2-methallyl, crotyl or cycloalkyl, or $R_1$ and $R_2$, together with the nitrogen atom, are a heterocyclic saturated or unsaturated ring, or $R_1$ and $R_2$ are phenyl or said phenyl substitued by one or more methyl, ethyl, methoxy, ethoxy, carboxyl or sulfonic acid groups, $R_1$ and $R_2$ being in each case identical or different, in which $R_3$ is hydrogen or alkyl of from 1 to 4 carbon atoms or said alkyl substituted by hydroxyl or carboxyl groups, in which X is hydrogen or alkyl or alkoxy of from 1 to 4 carbon atoms, in which Y is —$CH_2$—$CH_2$—Z in which Z is —$OSO_3H$, —$SSO_3H$, —$OPO_3H_2$, or —OH, a is a number of from 0 to 2, b is a number of from 0 to 2 and c is a number of from 1.7 to 2.6, with the proviso that the sum of a, b and c is at most 4.

2. The compound of the formula

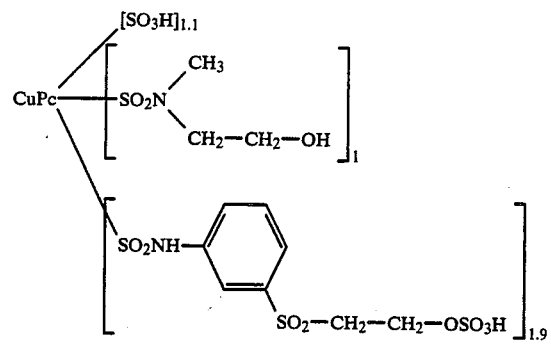

3. The compound of the formula

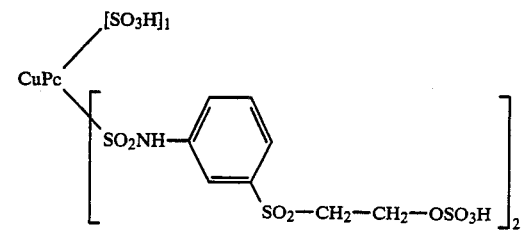

* * * * *